United States Patent
Cai et al.

(10) Patent No.: US 12,337,281 B2
(45) Date of Patent: Jun. 24, 2025

(54) EMISSION REDUCTION DEVICE FOR COOKING FUMES PRODUCED FROM SMOKING, FRYING AND ROASTING

(71) Applicant: Hefei University of Technology, Hefei (CN)

(72) Inventors: Kezhou Cai, Hefei (CN); Xingyun Liu, Hefei (CN); Wei Xing, Hefei (CN); Teng Hui, Hefei (CN); Hui Zhou, Hefei (CN); Baocai Xu, Hefei (CN); Conggui Chen, Hefei (CN)

(73) Assignee: Hefei University of Technology (CN)

( * ) Notice: Subject to any disclaimer, the term of this patent is extended or adjusted under 35 U.S.C. 154(b) by 820 days.

(21) Appl. No.: 17/587,369

(22) Filed: Jan. 28, 2022

(65) Prior Publication Data
US 2022/0362713 A1  Nov. 17, 2022

(30) Foreign Application Priority Data

May 17, 2021 (CN) .......................... 202110533011.6

(51) Int. Cl.
| | |
|---|---|
| *B01D 53/86* | (2006.01) |
| *B01D 53/00* | (2006.01) |
| *B01D 53/04* | (2006.01) |
| *B01D 53/32* | (2006.01) |
| *B01J 19/00* | (2006.01) |

(Continued)

(52) U.S. Cl.
CPC ....... *B01D 53/8687* (2013.01); *B01D 53/007* (2013.01); *B01D 53/04* (2013.01); *B01D 53/323* (2013.01); *B01J 19/006* (2013.01); *B01J 21/063* (2013.01); *B01J 35/39* (2024.01); *F24C 15/2014* (2013.01); *F24C 15/2035* (2013.01); *B01D 2253/102* (2013.01); *B01D 2255/20707* (2013.01); *B01D 2255/802* (2013.01); *B01D 2257/708* (2013.01); *B01D 2258/0275* (2013.01); *B01D 2259/816* (2013.01); *B01D 2259/818* (2013.01)

(58) Field of Classification Search
None
See application file for complete search history.

(56) References Cited

FOREIGN PATENT DOCUMENTS

CN 208771202 U * 4/2019

OTHER PUBLICATIONS

Qiu, G. CN208771202U—translated document (Year: 2019).*

* cited by examiner

*Primary Examiner* — Jelitza M Perez
(74) *Attorney, Agent, or Firm* — Stuart H. Mayer; Kaplan Breyer Schwarz LLP

(57) ABSTRACT

An emission reduction device for cooking fumes produced from smoking, frying and roasting is provided, which includes a purifying-tank shell. One end of the purifying-tank shell is provided with an air inlet and other end of the purifying-tank shell is provided with an air outlet. The device further includes a nebulizer, an ultrasonic coagulating unit, and an electrostatic deposition unit, which are sequentially arranged in the purifying-tank shell from the air inlet to the air outlet. A box body is connected to the air outlet of the purifying-tank shell, the box body is provided with a photocatalytic oxidation unit, a plasma catalytic oxidation assembly and an end filter unit therein. An exhaust port is installed on a rear side of the box body. Two sides of the ultrasonic coagulating unit are each provided with a flow rectifier which is longitudinally and slidably arranged in the purifying-tank shell.

10 Claims, 2 Drawing Sheets

(51) Int. Cl.
*B01J 21/06* (2006.01)
*B01J 35/39* (2024.01)
*F24C 15/20* (2006.01)

EMISSION REDUCTION DEVICE FOR COOKING FUMES PRODUCED FROM SMOKING, FRYING AND ROASTING

CROSS REFERENCE TO RELATED APPLICATIONS

This patent application claims the benefit and priority of Chinese Patent Application No. 202110533011.6, entitled "emission reduction device for cooking fumes produced from smoking, frying and roasting" filed with the Chinese Patent Office on May 17, 2021, the disclosure of which is incorporated by reference herein in its entirety as part of the present application.

TECHNICAL FIELD

The present disclosure relates to the technology field of pollutants control in the thermal processing of food, in particular to a composite emission reduction device for pollutants from the food thermal processing based on the principle of both ultrasonic coagulation and photocatalytic oxidation.

BACKGROUND ART

The pollutants from the thermal processing of food such as smoking, frying, and roasting are volatilize grease, organic matter and fuel thereof, the products of food materials themselves after thermal decomposition, oxidation, thermal polymerization, and pyrolysis during the thermal processing of food. And, the pollutants have an extremely complex composition. The pollutants mainly include fuel combustion products, oil droplets, short-chain aldehydes, ketones, alkanes, alkenes, alcohols, esters, carboxylic acids, aromatic hydrocarbons and particle matters. When the cooking fumes emitted from smoking, frying and roasting are directly discharged into the atmosphere without purification treatment, aerosol particle matter and volatile organic compounds (VOCs) in the atmosphere undergo complex physical and photochemical reactions, thus forming photochemical smog. So, serious impacts on the ecological environment are occurred on the one hand, and damages to human health are also caused on the other hand. Therefore, it is necessary to purify and reduce emissions of toxic and harmful components such as particle matter (PM) and VOCs produced from smoking, frying and roasting of food. At present, inertial separation and electrostatic deposition technology are the most commonly used purification technologies for cooking fumes, which can only reduce the emission of large particle matters in the cooking fumes, and has a poor effect in reducing the emission of fine particle matters with aerodynamic diameter of less than 5 μm and VOCs pollutants in cooking fumes when these technologies are used individually. The purified cooking-fumes pollutants cannot meet the national emission limit value. Therefore, it is necessary to develop an efficient technology for reducing particle matters and VOCs emitted from smoking, frying and roasting of food, which is the key to control cooking-fumes pollution from the smoking, frying and roasting of food processing.

SUMMARY

The present disclosure aims to provide an emission reduction device for cooking fumes produced from smoking, frying and roasting. The device has high purification efficiency and is a composite emission reduction device for cooking fumes using ultrasonic coagulation and photocatalytic oxidation. The device includes an ultrasonic coagulation unit, an electrostatic deposition unit, a photocatalytic oxidation unit, and an end filter unit, which solves the low emission reduction of fine particle matters in cooking fumes by conventional purification equipment, and enables to realize the high-efficiency purification of VOCs in the cooking fumes simultaneously. The problems in the above-mentioned background art may be solved.

In order to achieve the above purpose, the present disclosure provides the following technical solutions.

The present disclosure provides an emission reduction device for the cooking fumes from the thermal processing of food such as smoking, frying, and roasting, which includes a purifying-tank shell. one end of the purifying-tank shell is provided with an air inlet and other end of the purifying-tank shell is provided with an air outlet. The device further includes a nebulizer, an ultrasonic coagulation unit, and an electrostatic deposition unit, which are sequentially arranged in the purifying-tank shell from the air inlet to the air outlet. A box body is connected to the air outlet of the purifying-tank shell. The box body is provided with a photocatalytic oxidation unit, a plasmas catalytic oxidation assembly and an end filter unit therein. An exhaust port is installed on a rear side of the box body. Two sides of the ultrasonic coagulation unit are each provided with a flow rectifier, which is longitudinally and slidably arranged in the purifying-tank shell. A cleaning tank is fixedly installed below the purifying-tank shell by a fixing support. An opening is formed on a top of the cleaning tank, and first ultrasonic generators are installed in the cleaning tank. The purifying-tank shell is provided with a driving device for driving the flow rectifier to slide longitudinally.

In some embodiments, each of first groove tubes and a corresponding one of second groove tubes may be respectively symmetrically arranged at a top and a bottom of the purifying-tank shell, both ends of the flow rectifier may be respectively embedded in the first grooved tube and the corresponding one of second grooved tubes. Each of first sealing rubber plates may be fixedly installed in a corresponding one of the first groove tubes, and each of second sealing rubber plates may be fixedly installed in a corresponding one of the second groove tubes. The second sealing rubber plate may be provided with an extrusion gap for the flow rectifier to pass through. A sealing door which opens downward unidirectionally may be hinged at an end opening of the second groove tube.

In some embodiments, the driving device may include a winch and a pulling rope. The winch may be fixedly installed on the top of the purifying-tank shell through a frame. The pulling rope may be wound on the winch, each of two ends of the pulling rope may pass through a corresponding one of the first groove tubes and the end of the pulling rope may be fixedly connected to the flow rectifier. The first sealing rubber plate may be provided with an extrusion hole for the pulling rope to pass through. A guide wheel for winding the pulling rope may be arranged on the purifying-tank shell.

In some embodiments, a cavity for flowing fluids may be arranged in a wall of the purifying-tank shell, and the cavity may be provided with an inlet and an outlet.

In some embodiments, a downcomer may be fixedly installed at the bottom of the purifying-tank shell and located at a corresponding position below the nebulizer. An inclined flow guide surface inclined toward the downcomer may be arranged at a bottom of an inner wall of the purifying-tank shell and located below the nebulizer.

In some embodiments, the ultrasonic coagulating unit may include second ultrasonic generators and a reflecting plate. The second ultrasonic generators may be arranged on an upper side and a lower side of the purifying-tank shell. The reflecting plate may be installed at a middle of an inside of the purifying-tank shell, and may be arranged in parallel with the second ultrasonic generators.

In some embodiments, an anti-corrosion structure may be arranged in a section of an inner wall the purifying-tank shell which may be installed with the nebulizer. The anti-corrosion structure may be fiber reinforced plastic.

In some embodiments, the electrostatic deposition unit may include a positive plate and a negative plate, which may be symmetrically installed on an upper side and a lower side of the purifying-tank shell respectively.

In some embodiments, the photocatalytic oxidation unit may include baffle plates and ultraviolet light sources, a surface of each of the baffle plates may be coated with titanium dioxide (TiO2) coating. Two guard plates may be vertically installed in the box body. The two guard plates may separate the box body into a vertical S-shaped flow channel. Each of the baffle plates may be fixedly installed on an inner side of a corresponding one of the two guard plates and may divide space between the two guard plates into a horizontal S-shaped flow channel. Each of the ultraviolet light sources may be arranged on an inner side walls of a corresponding one of the two guard plates, and the ultraviolet light sources may be each an ultraviolet lamp with a wavelength of 185 nm.

In some embodiments, the end filter unit may be an activated carbon fiber filter mesh.

Compared with the prior art, the embodiments have the following technical effects.

(1) The embodiments provide a composite emission reduction device for cooking-fumes pollutants using ultrasonic coagulation and photocatalytic oxidation, which adopts ultrasonic coagulation technology, photocatalytic oxidation technology and end filtration technology. The device applies secondary coagulation for fine particle matters to make them migrate, condensate and adsorb, so as to form larger particle matters, thereby overcoming the problem of low efficiency of traditional purification equipment for the purification of fine particle matters in cooking fumes. The device enables VOCs in cooking fumes to be purified twice via photocatalytic oxidation and end filtration after the particle matters has been removed from the cooking fumes, thereby realizing the effective emission reduction for particle matters and VOCs in cooking fumes from smoking, frying and roasting simultaneously.

(2) The nebulizer unit is arranged at the air inlet, so that the cooking fumes may be combined with water mist when the cooking fumes flow into the purification equipment. In this way, the chance of fine particle matters being adsorbed and colliding is increased, and ultrasonic agglomeration fine particle matters is further facilitated to form into larger particle matters.

(3) The flow rectifier are longitudinally and slidably connected to the purifying-tank shell, and the cleaning tank with ultrasonic generators is arranged below the purifying-tank shell, so that the automatic cleaning operation of the flow rectifier may be realized, and holes of each flow rectifier may be unobstructed, thereby ensuring smooth flow of the cooking-fumes gas.

Figure 1:
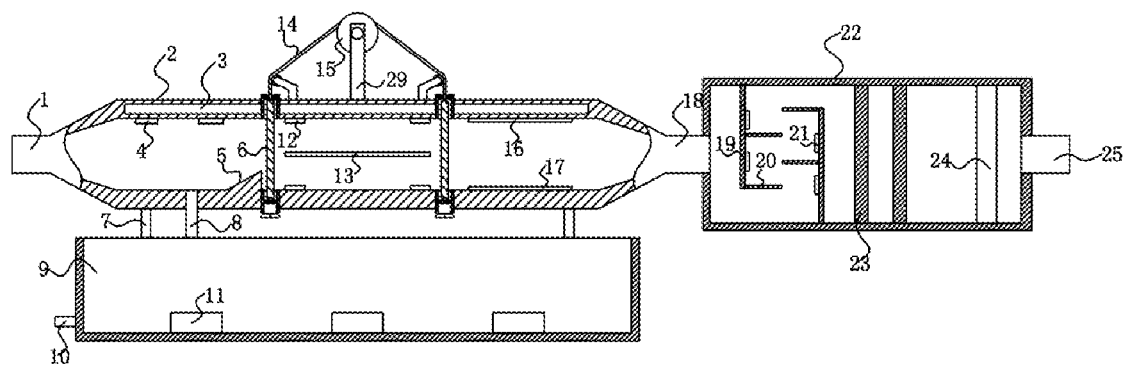
FIG. 1 is a schematic structural diagram of an emission reduction device for cooking fumes produced from smoking, frying and roasting according to the present disclosure.

LIST OF THE REFERENCE CHARACTERS 1 air inlet; 2 purifying-tank shell; 3 cavity; 4 nebulizer; 5 inclined flow guide surface; 6 flow rectifier; 7 fixing support; 8 downcomer; 9 cleaning tank; 10 drain pipe; 11 first ultrasonic generator; 12 second ultrasonic generator; 13 reflecting plate; 14 pulling rope; 15 winch; 16 positive plate; 17 negative plate; 18 air outlet; 19 guard plate; 20 baffle plate; 21 ultraviolet light source; 22 box body; 23 plasmas catalytic oxidation assembly; 24 activated carbon fiber filter mesh; 25 exhaust port; 26 first groove tube; 27 first sealing rubber plate; 28 guide wheel; 29 frame; 30 second groove tube; 31 sealing door; and 32 second sealing rubber plate.

DETAILED DESCRIPTION OF THE EMBODIMENTS

In order to describe in detail, the technical content, structural features, achieved purpose and effects of the technical solution, the following will describe this embodiment in detail with reference to specific embodiments and accompanying drawings.

Figure 2:
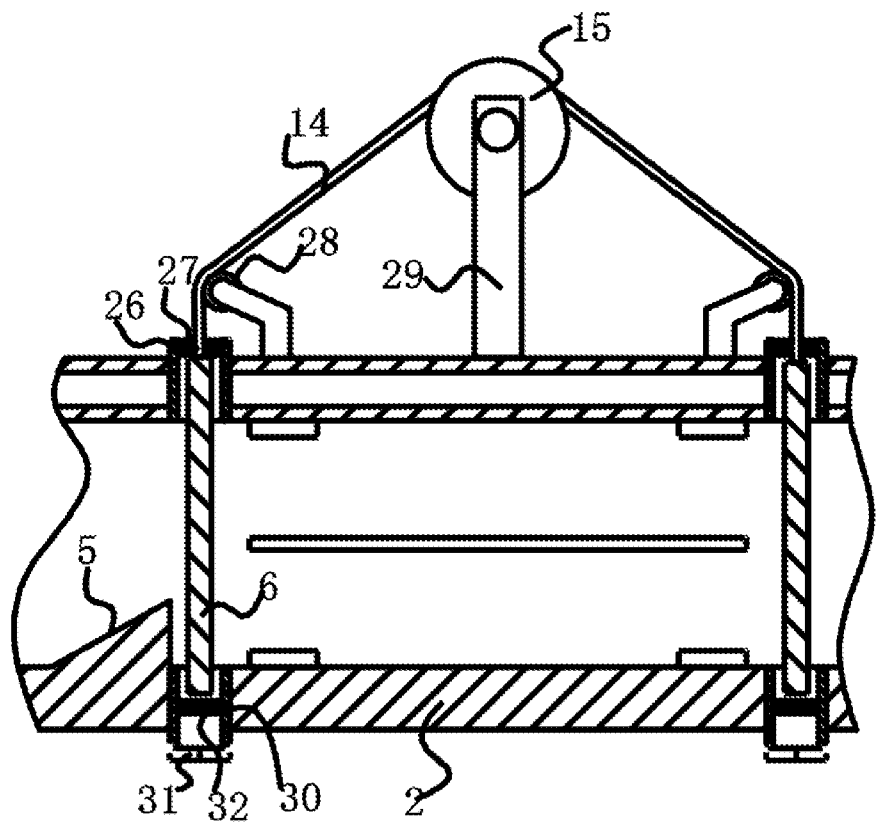
FIG. 2 is a partial enlarged view of FIG. 1.
Figure 3:
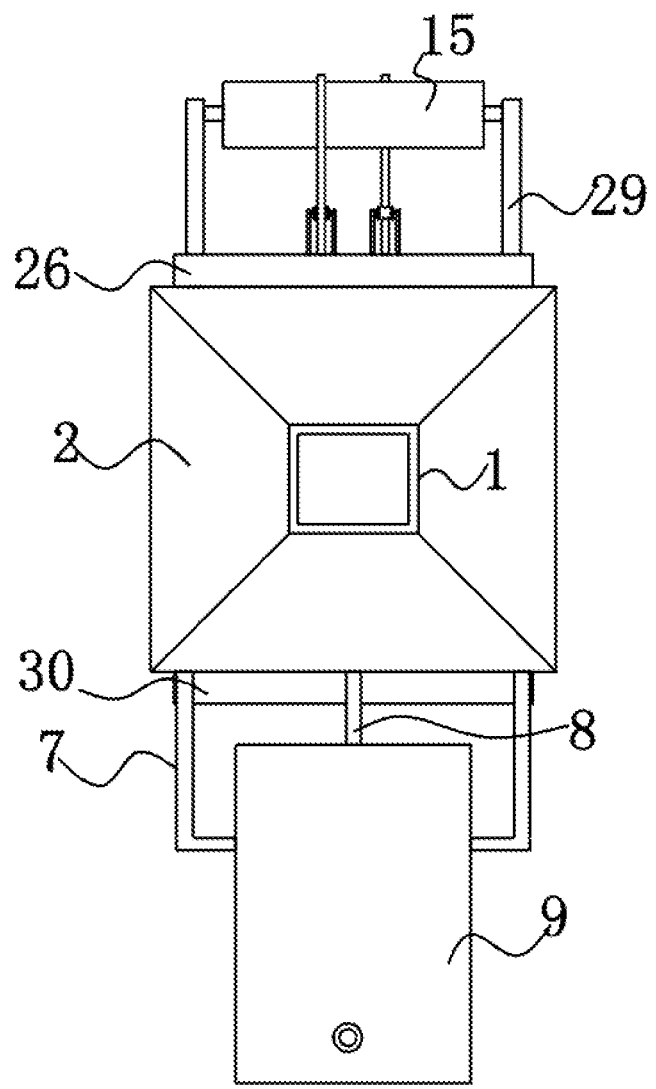
FIG. 3 is a side view of the emission reduction device for cooking fumes produced from smoking, frying and roasting.

Refer to FIGS. 1-3, an emission reduction device for cooking fumes produced from smoking, frying and roasting is provided. The device includes a purifying-tank shell 2, one end of the purifying-tank shell 2 is provided with an air inlet 1 and other end of the purifying-tank shell is provided with an air outlet 18. The device further includes a nebulizer 4, an ultrasonic coagulating unit, and an electrostatic deposition unit, which are sequentially arranged in the purifying-tank shell 2 from the air inlet 1 to the air outlet 18. A box body 22 is connected to the air outlet 18 of the purifying-tank shell 2, and the box body is provided with a photocatalytic oxidation unit, a plasma catalytic oxidation assembly 23 and an end filter unit therein. The end filter unit is an activated carbon fiber filter mesh 24. An exhaust port 25 is installed on a rear side of the box body 22. Both sides of the ultrasonic coagulating unit are each provided with flow rectifier 6 which is longitudinally and slidably arranged in the purifying-tank shell 2. A cleaning tank 9 is fixedly installed below the purifying-tank shell 2 by a fixing support 7. An opening is formed on a top of the cleaning tank 9, and a drain pipe 10 for draining pollutants is installed on one side of the cleaning tank 9. First ultrasonic generators are installed in the cleaning tank 9. The purifying-tank shell 2 is provided with a driving device for driving the flow rectifiers 6 to slide longitudinally.

The cooking fumes generated during the traditional smoking, frying and roasting of food process enters the purifying-tank shell 2 through the air inlet 1. The nebulizer 4 located on a front side of the purifying-tank shell generates small suspended droplets. The particle matters in the cooking fumes collide and adsorb with the suspended small droplets, and the initially formed particle matters can remove some of the larger particle matters according to the principle of cloud physics. The cooking-fumes gas containing fine particle matters is processed by the flow rectifiers 6 to form uniform cooking-fumes gas, and then enters the ultrasonic coagulating unit. The fine particle matters are mixed, collided, migrated, and adsorbed under the action of the standing wave sound field; condensed into particle matters with larger particle size distribution by secondary growth; and enter the electrostatic deposition unit along with the gas, so as to remove the particle matters in the cooking-fumes gas. The cooking fumes after further removal of particle matters still contains a large amount of VOCs. The cooking-fumes gas after processed enters the photocatalytic oxidation unit and the plasmas catalytic oxidation assembly 23 to decompose the VOCs in the cooking-fumes gas, and finally passes through the end filter unit for filtering. The efficient purification of particle matters and VOCs in the cooking fumes during the smoking, frying and roasting of food is achieved, and the purpose for effectively reducing the emission of the cooking-fumes pollutants is also achieved.

After each flow rectifier 6 is used for a long time, a large amount of oil dirty will be deposited on holes of the flow rectifier 6. When the oil dirty is cleaned, the flow rectifier 6 can be driven to slide longitudinally downward and sink into the cleaning tank 9 through the driving device. The cleaning tank 9 is filled with water that contains cleaning liquid, and the water is ultrasonically oscillated by the first ultrasonic generators 11, so that the flow rectifier 6 are strongly decontaminated, thereby achieving the effect of automatic cleaning. After being cleaned, the flow rectifier 6 may be hoisted into the purifying-tank shell 2.

In the embodiment, in particular, each first groove tube 26 and a corresponding second groove tube 30 are respectively symmetrically arranged at a top and a bottom of the purifying-tank shell 2. Both ends of the flow rectifier 6 are respectively embedded in the first grooved tube and the second grooved tube. Each first sealing rubber plate 27 is fixedly installed in a corresponding first groove tube 26, and each second sealing rubber plate 32 is fixedly installed in a corresponding second groove tube 30. The second sealing rubber plate 32 is provided with an extrusion gap for the flow rectifier 6 to pass through. A sealing door 31 which opens downward unidirectionally is hinged at an end opening of the second groove tube 30. The end opening of the second grooved tube 30 and the first grooved tube 26 are sealed through the arrangement of the respective sealing rubber plates. The extrusion gap of the second sealing rubber plate 32 allows the flow rectifier 6 to pass downwards. That is, when the flow rectifier 6 slides down, the extrusion gap is opened by the self-weight of the flow rectifier, thereby enabling the flow rectifier to pass through freely.

In the embodiment, in particular, the driving device includes a winch 15 and a pulling rope 14. The winch is fixedly installed on a top of the purifying-tank shell 2 through a frame 29. The pulling rope 14 is wound on the winch 15, each of two ends of the pulling rope 14 passes through a corresponding first groove tube 26, and this end is fixedly connected to the flow rectifier 6. The first sealing rubber plate 27 is provided with an extrusion hole for the pulling rope 14 to pass through. A guide wheel 28 for winding the pulling rope 14 is arranged on the purifying-tank shell 2.

In the embodiment, in order to effectively recover the heat energy in the cooking-fumes gas, a cavity 3 for flowing liquids is arranged in a wall of the purifying-tank shell 2. The cavity 3 is provided with an inlet and an outlet. Water or other heat-absorbing medium circulates in the cavity 3 to cool the cooking-fumes gas. Meanwhile, the cavity 3 recycles the absorbed heat energy, and the heat utilization efficiency of the cooking-fumes gas is improved.

In the embodiment, a downcomer 8 is fixedly installed at the bottom of the purifying-tank shell 2 and located at a corresponding position below the nebulizer 4. An inclined flow guide surface 5 inclined toward the downcomer 8 is arranged at a bottom of an inner wall of the purifying-tank shell 2 and located below the nebulizer 4, thereby enabling a water tank to form at the bottom of the purification tank shell 2. And, the water tank is connected to the cleaning tank 9 through the downcomer 8 to recover wastewater.

In the embodiment, in particular, the ultrasonic coagulation unit includes second ultrasonic generators 12 and a reflecting plate 13. The second ultrasonic generators 12 are arranged on an upper side and a lower side of the purifying-tank shell 2. The reflecting plate 13 is installed at a middle of an inside of the purifying-tank shell 2, and is arranged in parallel with the second ultrasonic generators. The fine particle matters in the cooking fumes may be in the standing wave sound field formed by the second ultrasonic generators 12. The fine particle matters may migrate toward standing wave node under the action of ultrasound, so that condensation of particle matters is realized. Preferably, in a purification module of the ultrasonic coagulating unit, a distance between the reflecting plate 13 and the second ultrasonic generators 12 is an integer multiple of a half of the ultrasonic wavelength, i.e., $\frac{1}{2}\lambda$.

Furthermore, the time that the fine particle matters in the cooking fumes are subjected to ultrasonic action is not less than 3 s.

In the embodiment, preferably, an anti-corrosion structure is arranged in a section of an inner wall of the purifying-tank shell 2 which is installed with the nebulizer 4, and the anti-corrosion structure is fiber reinforced plastic.

In the embodiment, in particular, the electrostatic deposition unit includes a positive plate 16 and a negative plate 17 which are symmetrically installed on an upper side and a lower side of the purifying-tank shell 2 respectively. The secondary-growth particle matters in the cooking-fumes gas are induced into particle matters with positive charge and negative charge in electrostatic field. The particle matters with positive charge and negative charge may deviate to the corresponding positive plate and negative plate under the action of the electric field force, and thus the particle matters in the cooking-fumes gas may be removed.

In the embodiment, specifically, the photocatalytic oxidation unit includes baffle plates 20 and ultraviolet light sources 21. A surface of each of the baffle plate 20 is coated with titanium dioxide ($TiO_2$) coating. Two guard plates 19 are vertically fixedly installed in the box body 22. The two guard plates 19 separate the box body 22 into a vertical S-shaped flow channel, so that the VOCs in the cooking fumes may stay in the photocatalytic oxidation unit for 50-90 seconds. Each of the ultraviolet light sources 21 is arranged on inner side walls of a corresponding one of the two guard plates 19, and is an ultraviolet lamp with a wavelength of 185 nm. The VOCs molecules in the cooking fumes may transition from the ground state to the excited state under the irradiation of the ultraviolet light sources 21. Water molecules contained in the cooking fumes may generate hydroxyl radicals under ultraviolet radiation. Gas molecules may be irradiated by the ultraviolet light sources 21 for a sufficient time in the S-shaped flow channel formed by the baffle plates 20. VOCs may be decomposed into VOCs of small molecules, as well as carbon dioxide and $H_2O$ under the catalytic oxidation of the hydroxyl radicals and Nano-$TiO_2$, so as to achieve the purpose of decomposition.

In the embodiment, further, an induced draft fan that has adjustable power is provided at a gas outlet of the end filter unit, and the flow rate of the cooking-fumes gas in the purification equipment may be controlled by adjusting the power of the induced draft fan.

It should be noted that in this document, relational terms such as "first" and "second" are only used to distinguish one entity or operation from another entity or operation, and do not necessarily require or imply any such actual relationship or order between these entities or operations. Moreover, terms "include", "comprise" or any other variants thereof are intended to cover non-exclusive inclusion. Thus, a process, method, article, or terminal device that includes a series of elements includes not only those elements, but also other elements that are not explicitly listed, or also include elements inherent to the process, method, article, or terminal device. If there are no more restrictions, the elements defined by sentences "including . . . " or "comprising . . . " do not exclude the existence of other elements in the process, method, article, or terminal device that includes the elements. In addition, the terms such as "greater than", "less than", "exceeding" disclosed herein are understood to not include the number itself; "above", "below", "within" are understood to include the number itself.

Although the above embodiments have been described, those skilled in the art may make additional changes and modifications to these embodiments once they know the basic inventive concept. Therefore, the above descriptions are only examples of the present disclosure, and are not intended to limit the scope of patent protection of the present disclosure. Any equivalent structure or equivalent process transformation made by using the contents of the description and drawings of the present disclosure, or directly or indirectly used in other related technical fields, are similarly included in the scope of patent protection of the present disclosure.

What is claimed is:

1. An emission reduction device for cooking fumes produced from smoking, frying and roasting, the emission reduction device comprising a purifying-tank shell, one end of the purifying-tank shell is provided with an air inlet and other end of the purifying-tank shell is provided with an air outlet, wherein the emission reduction device further comprises a nebulizer, an ultrasonic coagulating unit, and an electrostatic deposition unit, which are sequentially arranged in the purifying-tank shell from the air inlet to the air outlet; a box body is connected to the air outlet of the purifying-tank shell; the box body is provided with a photocatalytic oxidation unit, a plasma catalytic oxidation assembly and an end filter unit therein; an exhaust port is installed on a rear side of the box body; two sides of the ultrasonic coagulating unit are each provided with a flow rectifier which is longitudinally and slidably arranged in the purifying-tank shell; a cleaning tank is fixedly installed below the purifying-tank shell by a fixing support, an opening is formed on a top of the cleaning tank, and first ultrasonic generators are installed in the cleaning tank; the purifying-tank shell is provided with a driving device for driving the flow rectifier to slide longitudinally.

2. The emission reduction device for cooking fumes produced from smoking, frying and roasting according to claim 1, wherein each of first groove tubes and a corresponding one of second groove tubes are respectively symmetrically arranged at a top and a bottom of the purifying-tank shell, both ends of the flow rectifier are respectively embedded in the first groove tube and the corresponding one of second groove tubes; each of first sealing rubber plates is fixedly installed in a corresponding one of the first groove tubes, and each of second sealing rubber plates is fixedly installed in a corresponding one of the second groove tubes; the second sealing rubber plate is provided with an extrusion gap for the flow rectifier to pass through; a sealing door which opens downward unidirectionally is hinged at an end opening of the second groove tube.

3. The emission reduction device for cooking fumes produced from smoking, frying and roasting according to claim 2, wherein the driving device comprises a winch and a pulling rope, the winch is fixedly installed on the top of the purifying-tank shell through a frame, the pulling rope is wound on the winch, each of two ends of the pulling rope passes through a corresponding one of the first groove tubes, and the end of the pulling rope is fixedly connected to the flow rectifier; the first sealing rubber plate is provided with an extrusion hole for the pulling rope to pass through, a guide wheel for winding the pulling rope is arranged on the purifying-tank shell.

4. The emission reduction device for cooking fumes produced from smoking, frying and roasting according to claim 1, wherein a cavity for flowing fluids is arranged in a wall of the purifying-tank shell, and the cavity is provided with an inlet and an outlet.

5. The emission reduction device for cooking fumes produced from smoking, frying and roasting according to claim 1, wherein a downcomer is fixedly installed at the bottom of the purifying-tank shell and located at a corresponding position below the nebulizer; an inclined flow guide surface inclined toward the downcomer is arranged at a bottom of an inner wall of the purifying-tank shell and located below the nebulizer.

6. The emission reduction device for cooking fumes produced from smoking, frying and roasting according to claim 1, wherein the ultrasonic coagulating unit comprises second ultrasonic generators and a reflecting plate, the second ultrasonic generators are arranged on an upper side and a lower side of the purifying-tank shell, the reflecting plate is installed at a middle of an inside of the purifying-tank shell and is arranged in parallel with the second ultrasonic generators.

7. The emission reduction device for cooking fumes produced from smoking, frying and roasting according to claim 1, wherein an anti-corrosion structure is arranged in a section of an inner wall the purifying-tank shell which is installed with the nebulizer, and the anti-corrosion structure is fiber reinforced plastic.

8. The emission reduction device for cooking fumes produced from smoking, frying and roasting according to claim 1, wherein the electrostatic deposition unit comprises a positive plate and a negative plate which are symmetrically installed on an upper side and a lower side of the purifying-tank shell respectively.

9. The emission reduction device for cooking fumes produced from smoking, frying and roasting according to claim 1, wherein the photocatalytic oxidation unit comprises baffle plates and ultraviolet light sources, a surface of each of the baffle plates is coated with $TiO_2$ coating; two guard plates are vertically fixedly installed in the box body, the two guard plates separate the box body into a vertical S-shaped flow channel; each of the baffle plates is fixedly installed on an inner side of a corresponding one of the two guard plates and divides space between the two guard plates into a horizontal S-shaped flow channel; each of the ultraviolet light sources is arranged on an inner side wall of a corresponding one of the two guard plates, and the ultraviolet light sources are each an ultraviolet lamp with a wavelength of 185 nm.

10. The emission reduction device for cooking fumes produced from smoking, frying and roasting according to claim 1, wherein the end filter unit is an activated carbon fiber filter mesh.

* * * * *